United States Patent [19]

Kaede

[11] Patent Number: 5,339,185
[45] Date of Patent: Aug. 16, 1994

[54] OPTICAL TIMING EXTRACTION CIRCUIT

[75] Inventor: Kazuhisa Kaede, Tokyo, Japan

[73] Assignee: NEC Corporation, Tokyo, Japan

[21] Appl. No.: 921,086

[22] Filed: Jul. 29, 1992

[30] Foreign Application Priority Data

Jul. 29, 1991 [JP] Japan ................... 3-212775

[51] Int. Cl.$^5$ .............................. H04J 14/00
[52] U.S. Cl. .................... 359/158; 359/182; 359/189; 359/195; 341/68
[58] Field of Search ............... 359/139, 158, 182, 189, 359/190, 191, 195; 341/68, 69; 307/269

[56] References Cited

U.S. PATENT DOCUMENTS 4,991,975  2/1991  Alferness et al. .................. 359/139

OTHER PUBLICATIONS

Jinno et al., "All-optical Timing Extraction Circuit", Material of Institute of Electronics, Information and Communication Engineers, Optical Communication System Seminar, Dec. 1988, pp. 68–74.

*Primary Examiner*—Douglas W. Olms
*Assistant Examiner*—Russell W. Blum
*Attorney, Agent, or Firm*—Foley & Lardner

[57] ABSTRACT

An optical timing extraction circuit is capable of extracting an optical clock signal of greater than tens of Gb/sec from a NRZ modulated signal. The light intensity level of a light signal modulated in intensity by an NRZ signal is amplified to a level sufficient to cause the optical Kerr effect, and combined with a CW light from a semiconductor laser which is modulated in frequency by the amplified light signal in an optical converting circuit by utilizing the optical Kerr effect. This frequency-modulated light is passed through a narrow band-pass optical filter to cause a signal intensity-modulated pulsed light at each intensity changing point of the modulated signal. Next, after the pulsed light is amplified up to a required optical intensity level, it is passed through another narrow band-pass optical filter, which is an optical tank for extracting the optical clock, to extract an optical clock signal.

8 Claims, 11 Drawing Sheets

OPTICAL TIMING EXTRACTION CIRCUIT

BACKGROUND OF THE INVENTION

1. Field of the Invention

The present invention relates to an optical timing extraction circuit for use in the field of optical communication.

2. Description of the Prior Art

In recent years, as optical communication techniques has been developed in response to a demand for further speeding up of the performance of communication networks, optical transmission whose transmission speed amounts to tens of Gb/s is being realized. In this case, a timing extracting circuit is indispensable for the transmission system. However, it is difficult to realize such a circuit in a transmission speed range of over several tens of Gb/s with electronic circuits, and a clock extracting technique using an optical circuit becomes necessary. Conventionally, as such, an optical timing extraction circuit using a narrow bandwidth optical filter, such as a Fabry-Pérot filter, as a clock extracting tank, was proposed in a paper entitled "All-optical Timing Extraction Circuit", Jinno et al, Material of Institute of Electronics, Information and Communication Engineers, Optical Communication System Seminar, December 1988, pages 68 through 74, in which its free spectral range substantially coincides with the fundamental frequency of the transmitted signal.

However, in a conventional optical timing extraction circuit, the transmission line signal from which the clock signal can be extracted is restricted to an RZ signal, and it cannot be done for an NRZ signal. Therefore, with the conventional optical clock extracting circuit, there has been a problem to be solved regarding the form of the optical signal from which the clock signal is to be extracted.

SUMMARY OF THE INVENTION

Accordingly, an object of the invention is to solve the foregoing problem and to provide an optical timing extracting circuit which allows the clock to be extracted for an NRZ signal whose transmission rate is above tens of Gb/s.

To this end, a first optical timing extraction circuit according to the invention comprises: converting means for converting an intensity modulated signal to an optical frequency modulated signal to which a first light modulated in intensity by an NRZ signal whose transmission rate is B bit/sec and a second light, which is a CW light, are entered to modulate the optical frequency of the latter by the former; first narrow band-pass optical filter means to which the second light, which has been modulated in frequency by the converting means is entered, one of the transmission center frequencies of the first filter means substantially coinciding with the neighborhood of the central frequency of the second light while the transmission bandwidth is substantially equal to the modulated width of the frequency of the second light; and second narrow band-pass optical filter means whose free spectral range substantially equals B Hz to extract and emit a sinusoidal optical clock signal whose frequency equals B Hz from the second light intensity-modulated by the first narrow band-pass optical filter means.

A second optical timing extraction circuit according to the invention comprises: first narrow band-pass optical filter means to which a first light FSK-modulated by an NRZ signal whose transmission rate equals B bit/sec is entered. One of the transmission center frequencies of the first filter means substantially coincides with the central frequency of the FSK modulated first light; converting means for converting an intensity modulated signal to an optical frequency modulated signal to which the first light, which was converted to the intensity modulated light by being transmitted through the first filter means, and a second light, which is a CW light, are entered to modulate the frequency of the second light by the first light; second narrow band-pass optical filter means, to which the second light modulated in frequency by the converting means is entered, and converted into the light modulated in intensity at the point where the frequency of the FSK-modulated signal is changed; and third narrow band-pass optical filter means to extract and emit an optical clock signal of sinusoidal form from the second light, which was passed through the second filter means.

One embodiment of the second invention described above includes second narrow band-pass optical filter means wherein one of the transmission center frequencies of the second filter means substantially coincides with one peak optical frequency of the frequency-modulated second light, the central optical frequency of the second light lying substantially at one end of the transmission bandwidth, a portion ranging from the central optical frequency of the second light up to the other peak optical frequency forming a reflecting frequency bandwidth; and the free spectral range of the third narrow band-pass optical filter means is approximately B Hz to emit an optical clock signal of sinusoidal form whose frequency is B Hz.

Another embodiment of the second invention described above includes second narrow band-pass optical filter means wherein one of the transmission center frequencies of the second filter means substantially coincides with the frequency of the second light before its frequency is modulated by the converting means, and whose transmission bandwidth is below the modulation width of the second light; and the free sepctral range of the third narrow band-pass optical filter means is approximately 2B Hz to emit an optical clock signal of sinusoidal form whose frequency is 2B Hz.

In the present invention, by using the foregoing arrangement, when the incident optical signal is modulated in intensity by the NRZ signal whose bit rate equals B bit for each sec, it is first converted into a signal modulated in frequency by the converting means. In other word, the first intensity modulated light and the second light, which is the CW light, are entered together to an optical material whose refractive index varies with the intensity of the incident light due to, for example, the Kerr effect. Since the refractive index of the optical material is modulated by the first light whose intensity was modulated, the optical frequency of the second light is modulated. Here, if the intensity of the first light is not sufficient to cause the Kerr effect in the foregoing optical material, it is raised in advance to a level sufficient to cause the optical Kerr effect by an optical amplifier. Now, since the intensity-modulated light is the NRZ signal light, the directions in which the frequency changes turn exactly opposite with the optical frequency of the second light as its center, for cases where the signal is changed from mark to space, and vice versa. Therefore, if the first narrow band-pass optical filter means, one of the central frequencies of whose transmission bandwidth is set to substantially the central frequency of the second light is used to capture the light reflected thereagainst, then it becomes a pulse signal modulated in intensity at the points where the NRZ signal is changed from mark to space and vice versa. Taking an analogy from the clock extraction circuit for the NRZ signal within a conventional circuit, this is equivalent to saying that the frequency modulation of the second light corresponds to differentiating the NRZ signal, and that the first narrow band-pass optical filter means corresponds to a squaring circuit. Now, if the light reflected from the first narrow band-pass filter means is passed through the second narrow band-pass filter means whose free spectrum range is approximately B Hz, then an optical clock signal modulated in intensity by B Hz, which is the fundamental frequency of the transmitted signal whose bit rate equals B bit/second, can be extracted.

Next, when the incident optical signal is the FSK-modulated light modulated by the NRZ signal whose bit rate equals B bit/second, the FSK-modulated light is first made to transmit the first optical filter means whose transmission bandwidth substantially corresponds to the width of the frequency modulation of the FSK-modulated light and whose central frequency of the transmission bandwidth is set at an approximately intermediate portion (at the substantially central portion if the peak is one) of the frequency spectrum peak of the FSK-modulated light. By doing so, a light pulse whose intensity is modulated is generated at the point where the frequency of the FSK signal is changed. Here, naturally, this intensity-modulated light has the width of the frequency modulation of the FSK signal light. Therefore, when the modulation factor of the FSK signal is great, even if the FSK signal light is injected, as is, into an optical clock extracting tank such as the foregoing first band-pass optical filter means, it can happen that an effectively high Q cannot be obtained. Therefore, if, after the intensity-modulated pulse light, which is generated at this frequency changing point, is turned into an intensity-modulated light whose frequency change is small following substantially the same process as in the foregoing NRZ intensity-modulated light, it is injected into the optical clock extracting tank (third band-pass optical filter), then an optical clock signal with a high Q can be extracted.

Since the processes described above are full-optical processes, it is possible to extract the optical clock signal from an NRZ modulated signal of above tens of 10 Gb/s.

The above and other objects, features and advantages of the present invention will become apparent from the following description when taken in conjunction with the accompanying drawings which illustrate preferred embodiments of the present invention by way of example.

BRIEF DESCRIPTION OF THE DRAWINGS

FIGS. 5(a)–(d) show a waveform view for explaining the transition of each optical signal waveform in the first embodiment from an entered optical intensity modulated signal to an emitted optical clock signal;

FIGS. 8(a)–(e) show a waveform view for explaining the transition of each optical signal waveform in the second embodiment from an entered optical frequency modulated signal to an emitted optical clock signal;

FIGS. 11(a)–(e) show a waveform view for explaining the transition of each optical signal waveform in the third embodiment from the entered optical frequency modulated signal up to the emitted optical clock signal.

DETAILED DESCRIPTION OF THE PREFERRED EMBODIMENTS

An optical timing extraction circuit according to the present invention is hereinafter described in further detail with reference to various embodiments.

Figure 1:
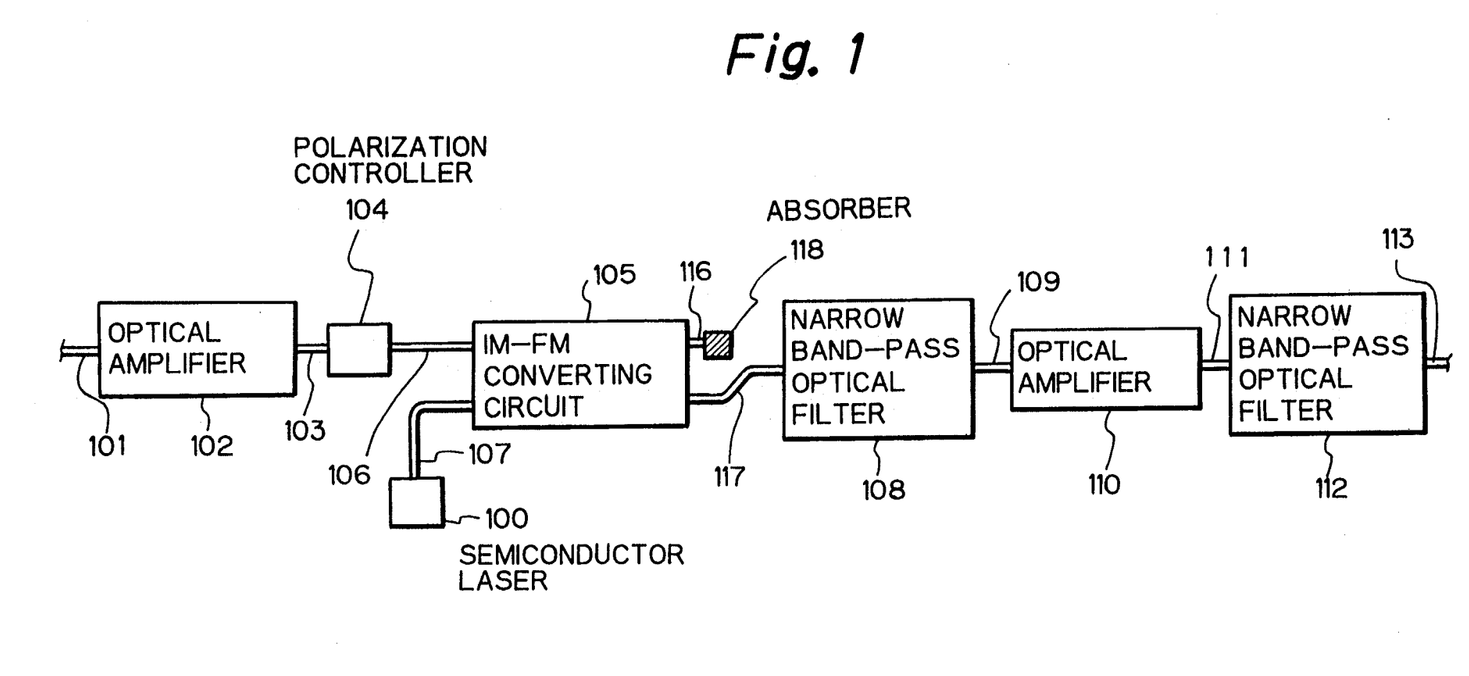
FIG. 1 is a block diagram illustrating the arrangement of a first embodiment of an optical timing extraction circuit according to the present invention.

First, the first embodiment illustrated in FIG. 1 is described.

Figure 2:
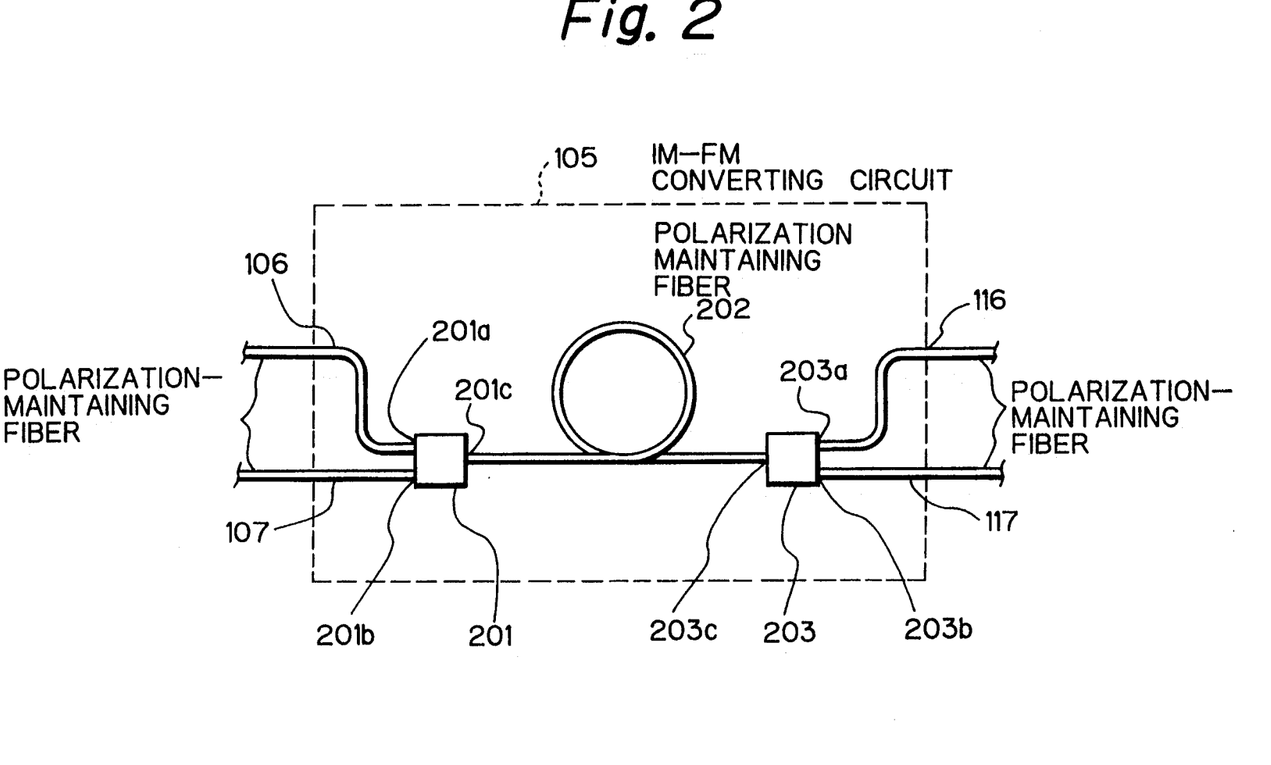
FIG. 2 is a view of the arrangement of a converting circuit (IM-FM) for converting an optical intensity modulated signal to the optical frequency modulated signal used in the first embodiment.
Figure 3:
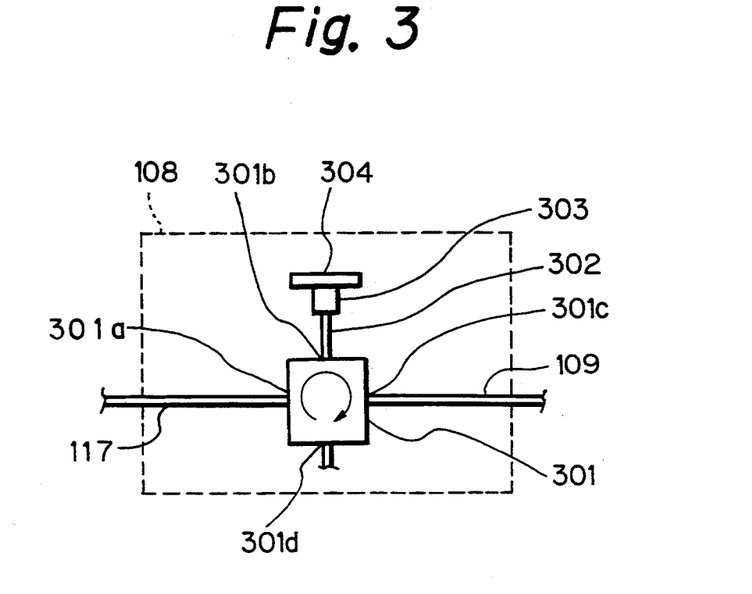
FIG. 3 is a view of the arrangement of narrow band-pass optical filter 108 used in the first embodiment.
Figure 4:
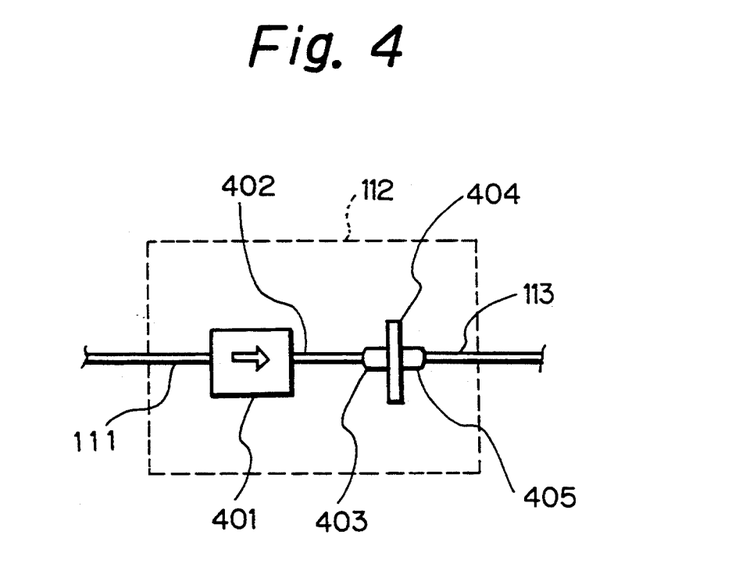
FIG. 4 is a view of the arrangement of narrow band-pass optical filter 112 used in the first embodiment.

Optical amplifier 102 amplifies an NRZ signal light to a required magnitude, the NRZ signal light being a first light modulated in intensity which is entered via optical fiber 101 from a signal supply means (not shown). Polarization controller 104 converts the NRZ signal light entered from optical amplifier 102 via optical fiber 103 into a linearly polarized light. IM-FM converting circuit 105, as shown in FIG. 2, is comprised of two polarization-maintaining wavelength division multiplexing-/demultiplexing couplers (hereafter called PM-WDM coupler) 201, 203 and polarization-maintaining fiber 202 of approximately 200 m in length, which is connected between terminals 201C, 203C of these couplers. To input terminals 201a, 201b of PM-WDM coupler 201, the NRZ signal light converted into the rectilinear polarized light and a CW light, being the second light, which is emitted from semiconductor laser 100, are each inputted via polarization-maintaining fibers 106, 107, respectively. However, one principal axis of each of polarization-maintaining fibers 106, 107, 202 is connected to coupler 201 so that the directions in which the first and second light beams are polarized coincide within polarization-maintaining fiber 202. Similarly, polarization-maintaining fibers 116, 117 are each connected to terminals 203a, 203b of coupler 203 so that their one principal axis coincides with the polarizing direction of the light incident from polarization-maintaining fiber 202. In polarization-maintaining fiber 202, the second light is modulated in frequency by the optical Kerr effect caused by the first light being modulated in intensity. Absorber 118 is connected to the other end of polarization-maintaining fiber 116 to absorb the incident first light. Narrow band-pass optical filter 108 is comprised of optical circulator 301 and Fabry-Pérot optical resonator 304, as shown in FIG. 3, to selectively reflect only a portion of the second light which has undergone the optical frequency modulation to emit to optical fiber 109 as the pulse of intensity modulated light. Optical amplifier 110 amplifies the second light entered from optical fiber 109 to emit to optical fiber 111. As shown in FIG. 4, narrow band-pass optical filter 112 is comprised of optical isolator 401 and Fabry-Pérot optical resonator 404 to generate an optical clock signal of resonant frequency from the second light incident from optical fiber 111 to emit to optical fiber 113.

Next, the operation of this embodiment is hereinafter described. The NRZ signal light modulated in intensity, which is the first light incident from optical fiber 101, is the signal light whose transmission rate is 40 Gb/s, whose wavelength is 1.55 μm and whose peak light power is approximately 3 μW, and is amplified to approximately 6 mW of the peak light power by optical amplifier 102 to be entered to optical fiber 103. Next, it is converted into rectilinear polarized light by polarization controller 104 to be entered so that the surface where the signal light is polarized coincides with one principal axis of polarization-maintaining fiber 106. The CW light, being the second light, is entered with a wavelength of 1.58 μm, a light spectrum width of approximately 1 MHz and an intensity of approximately 5 mW, keeping substantially the rectilinear form of the polarizing light emitted from semiconductor laser 100, so that its polarizing direction coincides with one of the principal axes of polarization-maintaining fiber 107. The NRZ signal light of wavelength 1.55 μm and the CW light of wavelength 1.58 μm, which are each entered to terminals 201a, 201b of coupler 201 via polarization-maintaining fibers 106, 107, are emitted from third terminal 201c with their polarizing directions coinciding to polarization-maintaining fiber 202. The CW light, while being propagated through fiber 202, is modulated in frequency by the optical Kerr effect caused by the optical intensity modulation of the NRZ optical signal to generate a frequency width of approximately 250 MHz from the central frequency. This frequency-modulated CW light is entered from terminal 203b of coupler 203 to optical fiber 117 while the NRZ signal light is entered from terminal 203a of coupler 203 through polarization-maintaining fiber 116 to absorber 118 where it is absorbed.

Figure 5:
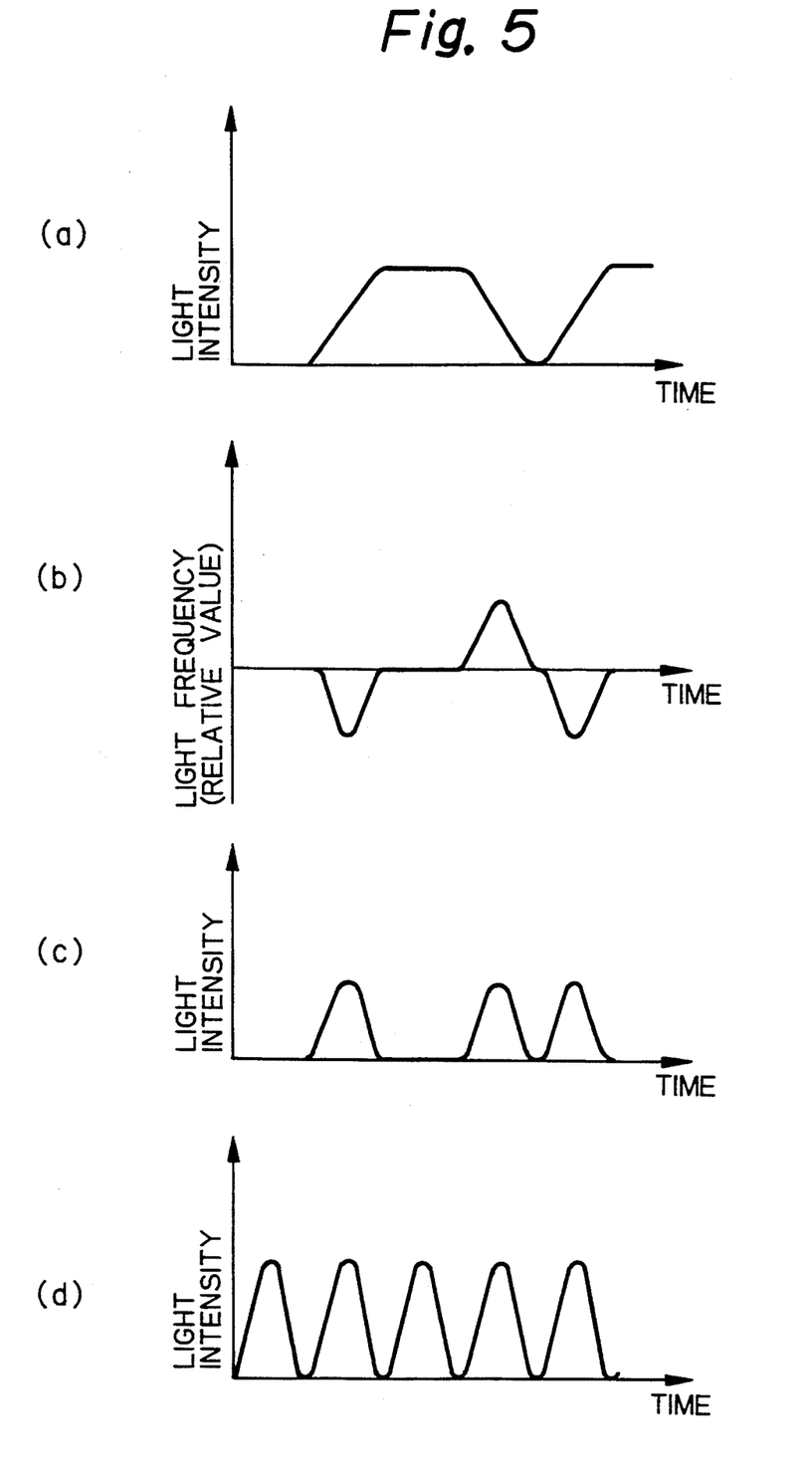
Figure 6:
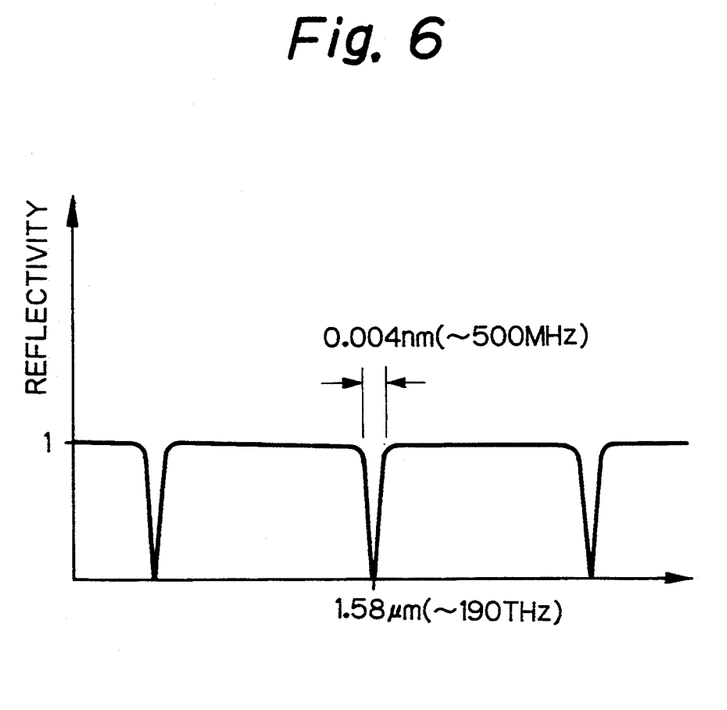
FIG. 6 is a characteristic curve of a Fabry-Pérot resonator in narrow band-pass optical filter 108 of FIG. 3.

FIGS. 5(a) and (b) schematically illustrate how this frequency modulation is carried out. FIG. 5(a) illustrates a change in the intensity of the NRZ signal light, which is the first light, in which at the points where the light intensity is changed from mark to space, or from space to mark, the phase of the CW light is modulated by the optical Kerr effect caused within the fiber 202 with the result that, as shown in FIG. 5(b), when the intensity of the first light is turned from strong to weak, the central frequency of the second light is swung into a higher frequency while, when that of the first light is changed from weak to strong, the central frequency of the second light is swung into a lower frequency. In this case, here, the second light converted into this frequency-modulated light is entered to terminal 301a of optical circulator 301 of narrow band-pass optical filter 108 via fiber 117 to be emitted from 301b. The second light emitted from terminal 301b is passed through optical fiber 302 to be collimated at rod lens 303 to be entered to Fabry-Pérot optical resonator 304. Here, referring to the reflection characteristic of Fabry-Pérot resonator 304, as shown in FIG. 6, one of the resonant frequencies coincides with the optical frequency of the second light, the transmission bandwidth is approximately 500 MHz and the free spectrum range is 10 GHz. Therefore, the frequency-modulated second light entered to Fabry-Pérot optical resonator 304 is reflected only at the portion which has undergone the optical frequency modulation. This reflected light is entered again via third optical fiber 302 and terminal 301b into optical circulator 301 and emitted from terminal 301c to optical fiber 109. Here, the second light which passes through narrow band-pass optical filter 108, as schematically shown in FIG. 5(c), has been converted into intensity modulated light. That is, the second light whose optical frequency is modulated as shown in FIG. 5(b), when it passes through narrow band-pass optical filter 108, is converted into intensity-modulated pulsed light as shown in FIG. 5(c). Each pulsed light is generated corresponding to the point where the optical intensity of the first light is changed. Now, the second light entered to optical fiber 109, after being amplified by optical amplifier 110, is emitted to optical fiber 111 and, after being propagated therethrough, is further entered to narrow band-pass filter 112. The second light, after passing through optical isolator 401, is collimated by rod lens 403 to be entered to Fabry-Pérot optical resonator 404, whose transmission bandwidth is approximately 500 MHz, whose free spectrum range is approximately 40 GHz and one of whose resonant frequencies coincides with 1.58 μm. As a result, an optical clock signal of sinusoidal form, as shown in FIG. 5(d) is obtained.

Figure 7:
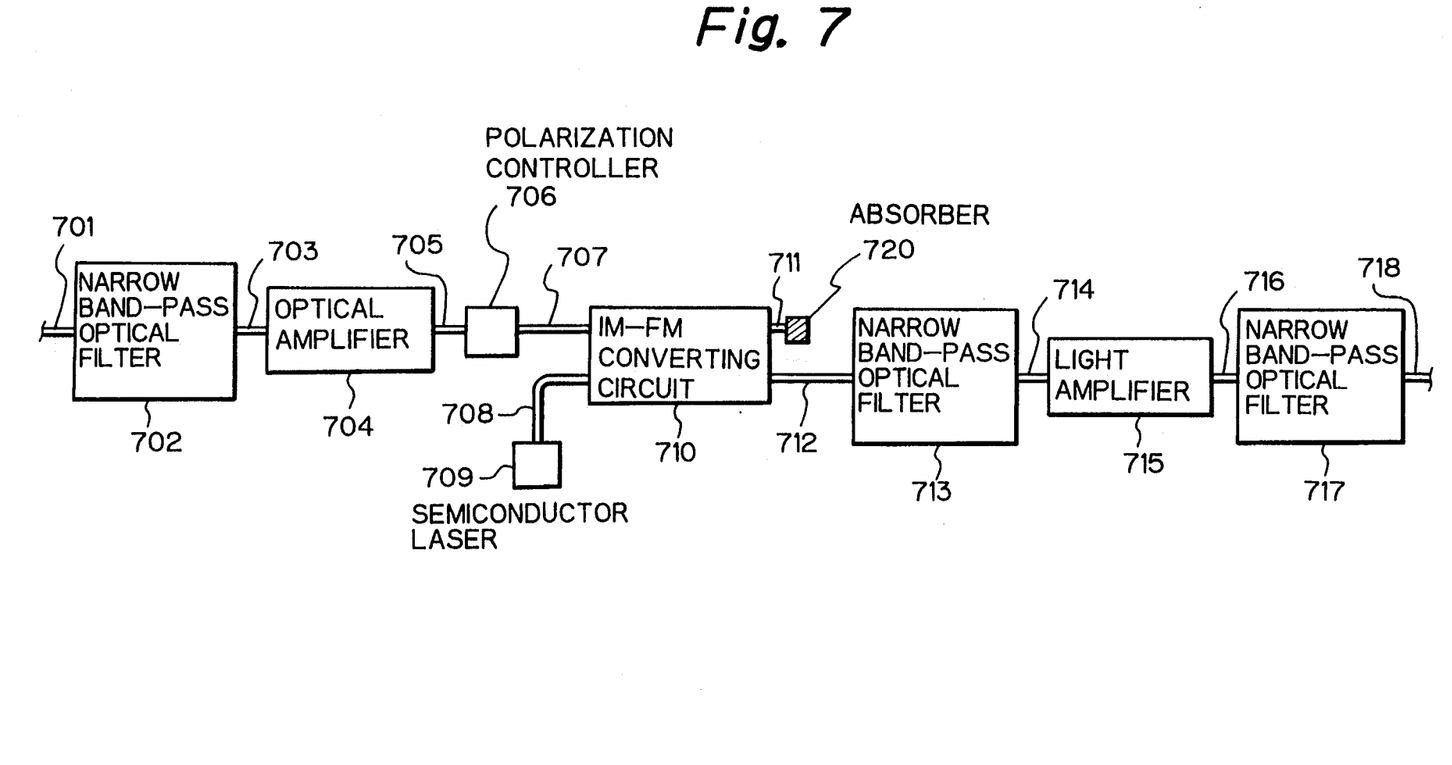
FIG. 7 is a block diagram illustrating the arrangement of a second embodiment of the optical timing extraction circuit according to the present invention.

Next, the second embodiment shown in FIG. 7 is described. Its arrangement is substantially the same as that of the first embodiment except that, since narrow band-pass optical filter 702, to which an FSK-modulated light, which is the first light FSK-modulated by an NRZ signal, is entered from a signal supply means (not shown), is provided before optical amplifier 704, its detailed description is omitted.

Next, the operation of this embodiment is described. An FSK signal light (FIG. 8(a)), which is the first light, which was FSK-modulated by an NRZ signal of 40 Gb/s in transmission rate and propagated through optical fiber 701, whose wavelength is 1.55 μm and whose modulation factor m=1, is converted into an intensity-modulated light (FIG. 8(b)) generating an optical pulse at the changing point of the NRZ signal. This intensity-modulated light is entered via optical fiber 703 to optical amplifier 704, where the peak power of the intensity modulated light is amplified to about 6 mW. The amplified first light is transmitted via optical fiber 705 to polarization controller 706 to be converted into linearly polarized light so that its plane of polarization coincides with one principal axis of polarization-maintaining fiber 707. It is further entered to a terminal of a PM-WDM coupler (not shown) of IM-FM converting circuit 710 through polarization-maintaining fiber 707. Further, to the other terminal of that coupler, a CW light whose wavelength is 1.58 μm, whose light spectrum width is 1 MHz and whose light intensity is approximately 5 mW is entered from semiconductor laser 709 as substantially linearly polarized light, so that its polarizing direction coincides with one principal axis of polarization-maintaining fiber 708. Here, the function of IM-FM converting circuit 710 is substantially the same as that of the first embodiment, and its detailed description is omitted.

Figure 8:
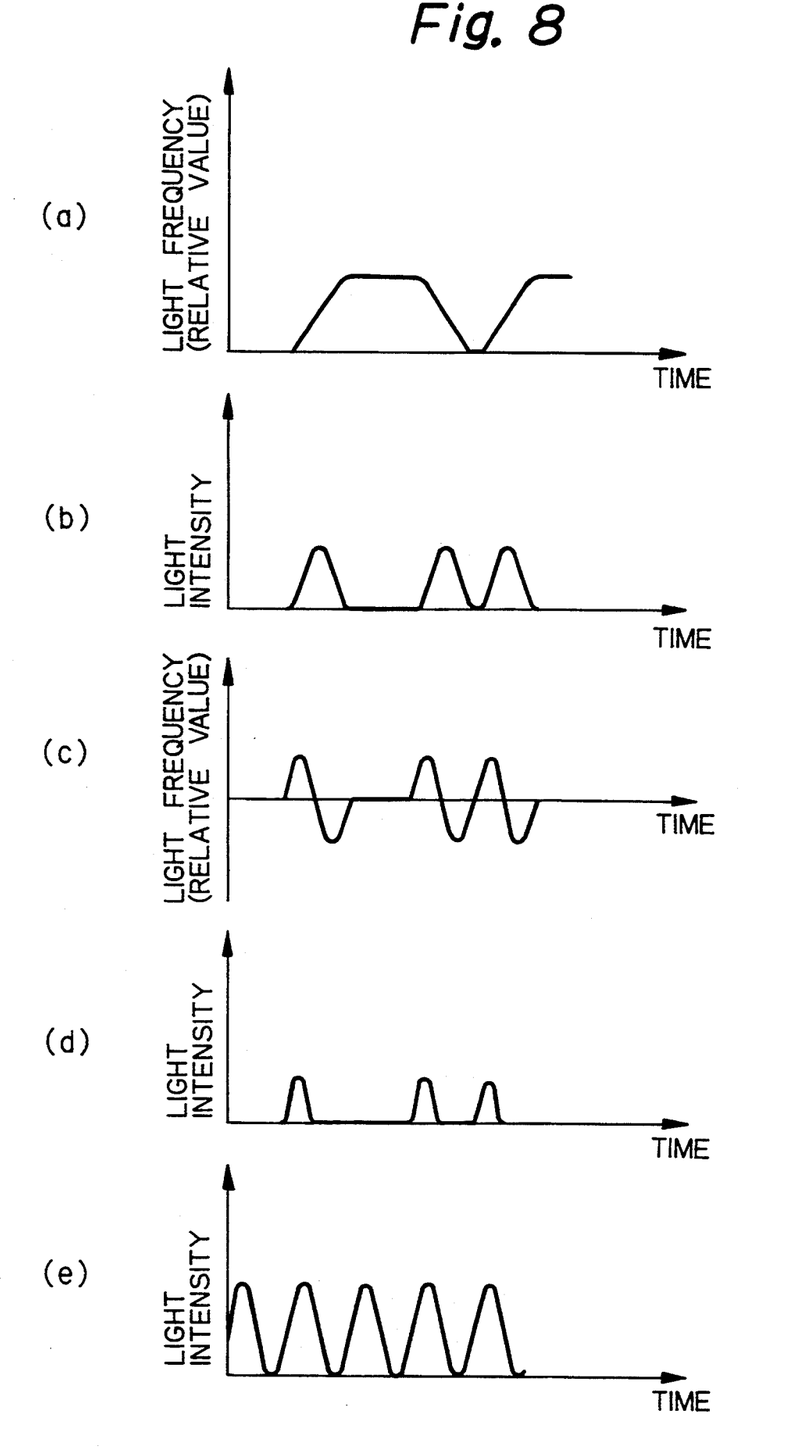
Figure 9:
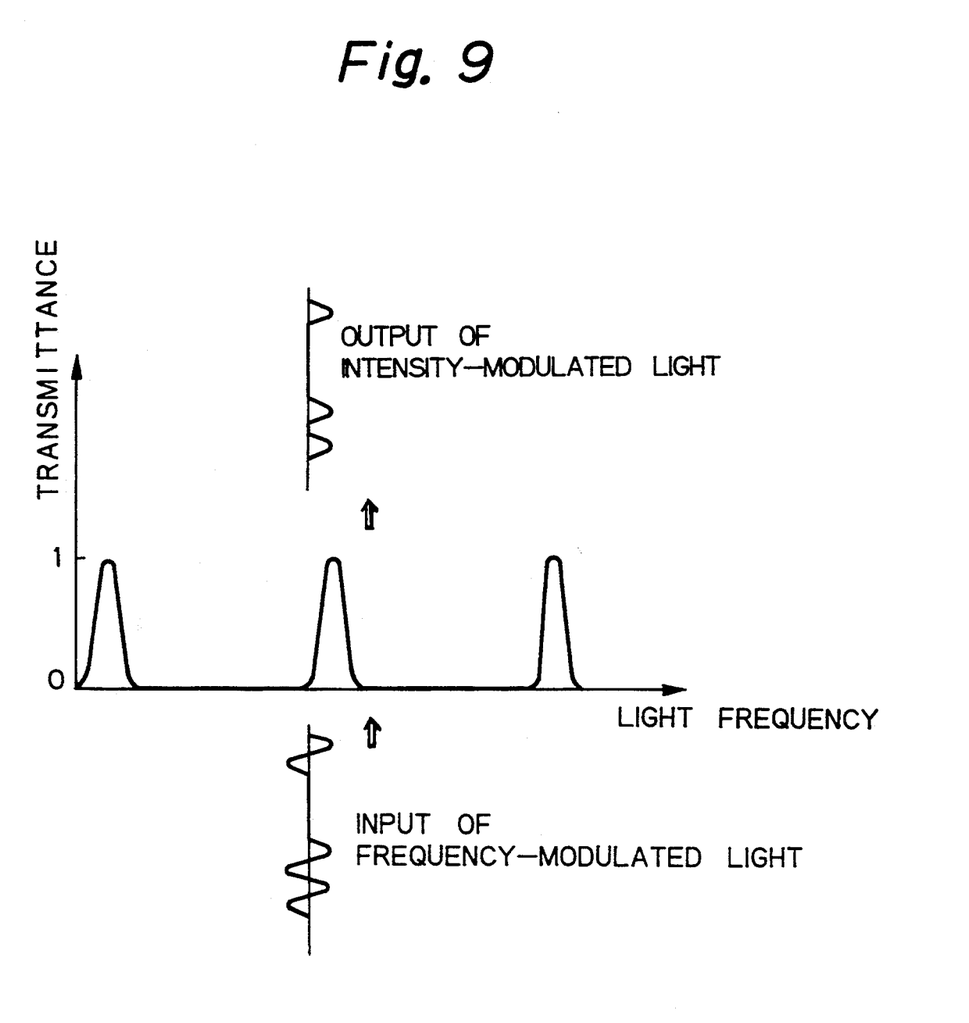
FIG. 9 is an explanatory view of the function of narrow band-pass filter 713 of FIG. 7.

From the output terminal of IM-FM converting circuit 710, the first light whose wavelength is 1.55 μm is emitted through polarization-maintaining fiber 711 to absorber 720 to be absorbed by it. On the other hand, from the other output terminal, the second light of wavelength of 1.58 μm, which was modulated in frequency by a width of approximately 250 MHz from the central frequency by IM-FM converting circuit 710, is emitted to polarization-maintaining fiber 712. However, the emitted second light, as shown in FIG. 8(c) is a light modulated in frequency which swings in both the positive and negative directions relative to the central frequency of the second light at each point corresponding to the frequency changing point of the FSK modulated light. Next, this second light which has been modulated in frequency is entered to narrow band-pass optical filter 713. Here, the arrangement of filter 713 is substantially the same as that of FIG. 3, which was described with reference to the first embodiment. However, as shown in FIG. 9, the transmission bandwidth of the Fabry-Pérot resonator is approximately 500 MHz, and it is arranged so that the central frequency of the second light comes at the end of the transmission bandwidth. Therefore, for this second light, only the portion which swings in the positive direction from its central frequency passes through band-pass optical filter 713 with the result that, as shown in FIG. 8(d), a single intensity-modulated pulse light is emitted corresponding to the frequency changing point of the FSK modulated light. After the output from filter 713 is amplified via optical fiber 714 by optical amplifier 715, it further passes through optical fiber 716, and an optical clock signal whose envelope frequency is 40 GHz and whose intensity changes in a sinusoidal form, as shown in FIG. 8(e), is obtained at narrow band-pass filter 717, to be emitted to optical fiber 718.

Figure 10:
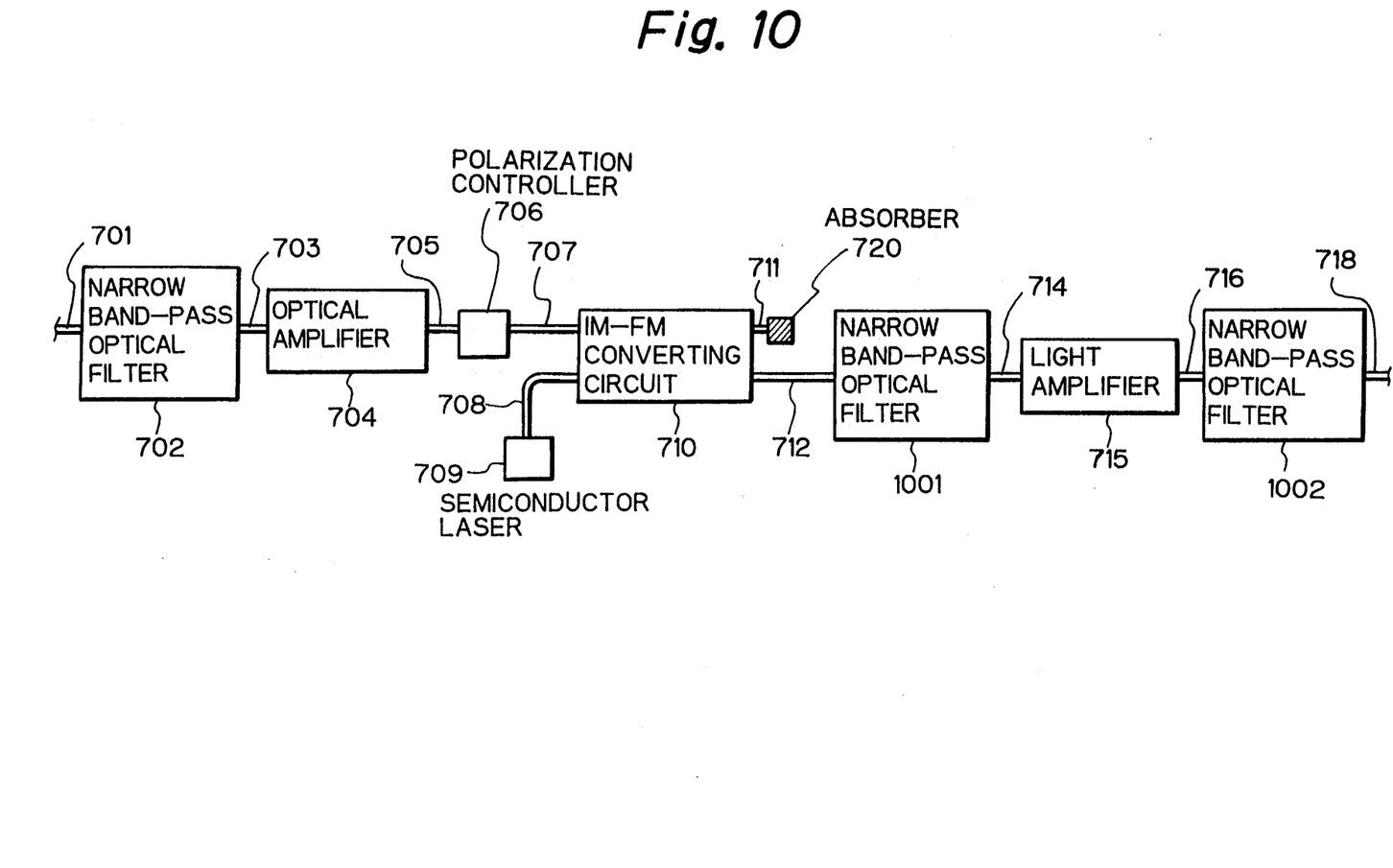
FIG. 10 is a block diagram illustrating the arrangement of a third embodiment of the optical timing extraction circuit according to the present invention.

Next, the third embodiment shown in FIG. 10 is described.

Since the arrangement of the third embodiment is substantially the same as that of the second embodiment except for narrow bandwidth filter 1001, only their differences in arrangement and function are described.

Figure 11:
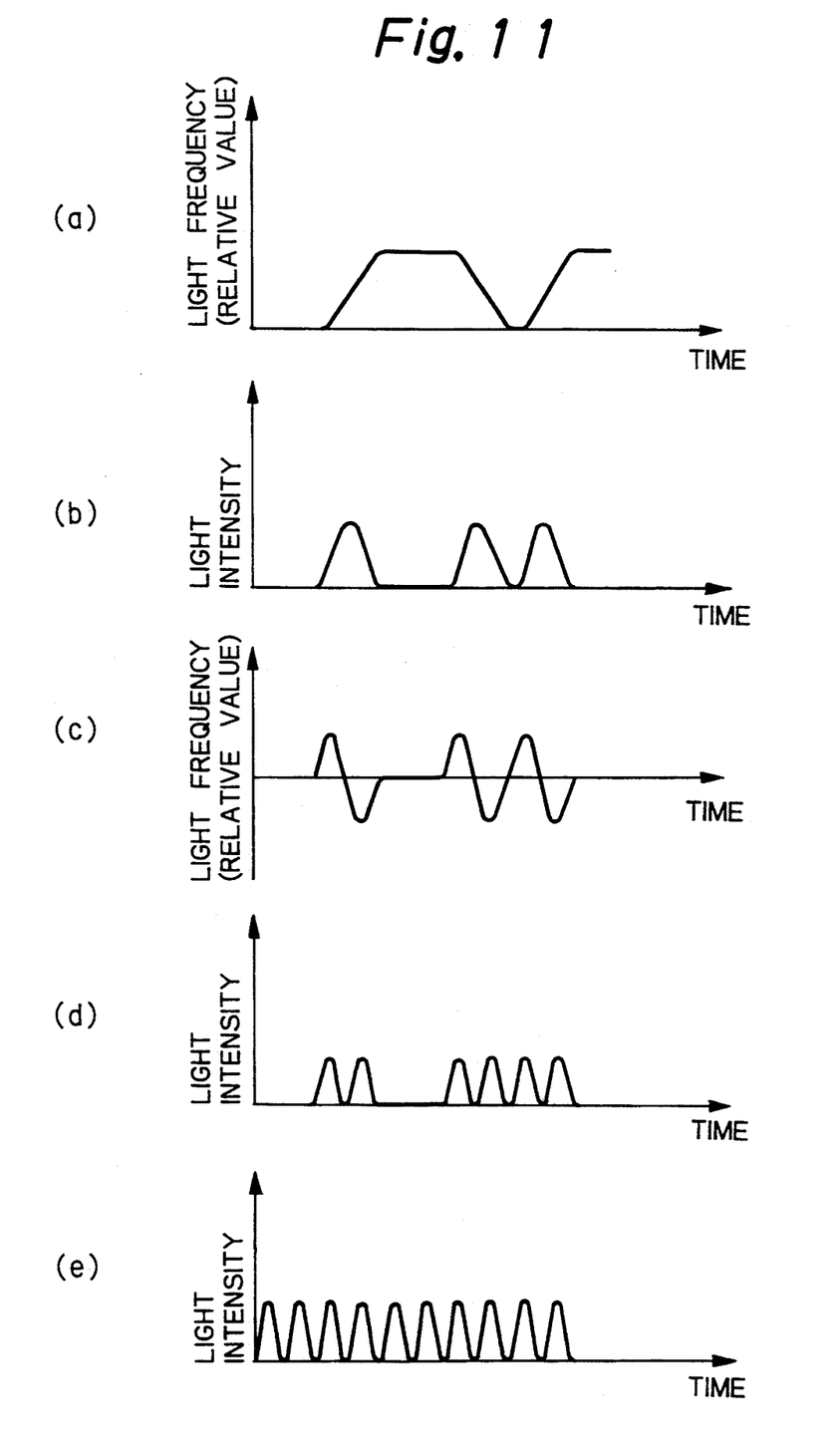
Figure 12:
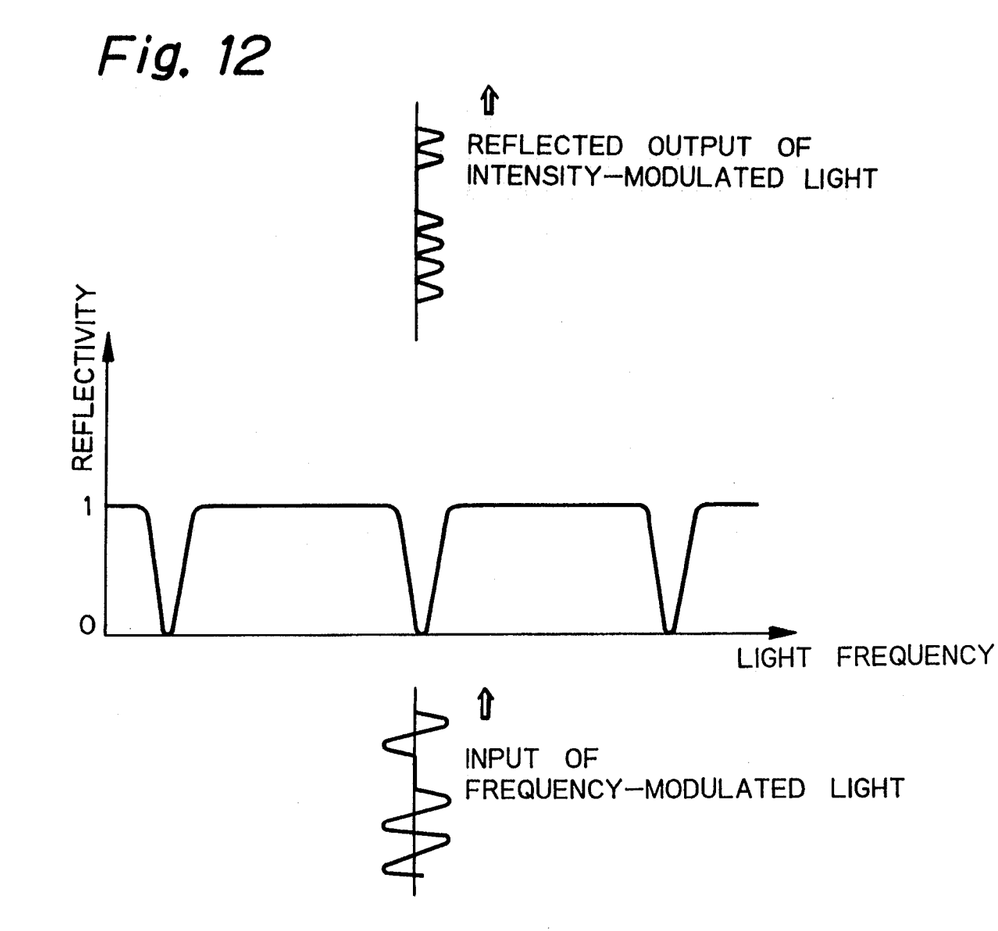
FIG. 12 is an explanatory view of the function of narrow band-pass filter 1001 of FIG. 10.

As in the second embodiment, a FSK signal (FIG. 11(a)) which was modulated by an NRZ signal of 40 Gb/s in transmission rate and propagated through optical fiber 701, whose wavelength is 1.55 μm and whose modulating factor m=1, is converted into an intensity-modulated light, as shown in FIG. 11(b), by narrow band-pass filter 702 and, after being further amplified by optical amplifier 704 and linearly polarized by polarizing controller 706, it is entered to IM-FM converting circuit 710. This first intensity-modulated light modulates the frequency of the second light at IM-FM converting circuit 710, while a second light of 1.58 μm in wavelength, as shown in FIG. 11(c), whose frequency has been modulated by a width of approximately 250 MHz distant from its central frequency, is emitted from IM-FM converting circuit 710. The arrangement of narrow band-pass optical filter 1001 is similar to that of narrow band-pass optical filter 108 (FIG. 3) in the first embodiment. The transmission bandwidth of Fabry-Pérot 304 described in the first embodiment is about 500 MHz and, as schematically shown in FIG. 12, the central frequency of its transmission bandwidth is set so as to substantially coincide with that of the second light. Therefore, from narrow bandwidth optical filter 1001 having the characteristic of FIG. 12, two intensity-modulated pulsed lights are emitted at each time corresponding to the frequency changing point of the first FSK-modulated light, as shown in FIG. 11(d). If these pulsed lights are passed through narrow band-pass optical filter 1002, then an optical clock signal whose envelope frequency is 80 GHz and whose intensity changes in a sinusoidal form is obtained, as shown in FIG. 11(e). Here, for narrow band-pass optical filter 1002, the transmission bandwidth of Fabry-Pérot optical resonator is approximately 500 MHz, the free spectrum range is approximately 80 GHz, and one of its resonant frequencies is set so as to coincide with 1.58 μm.

Heretofore, the first through third embodiments according to the present invention were described. Although, in the foregoing embodiments, the modulating rate of the NRZ modulated signal was 40 Gb/s, it is not necessarily restricted to that rate, but may be above or below it. However, the upper limit of the rate is limited by the response speed in the optical Kerr effect. In addition, although the first and second lights were set to 1.55 μm and 1.58 μm in wavelength, respectively, they are not restricted to those values. However, since, when the wavelength dispersion in the optical Kerr effect medium is great, a so-called walk-off takes place, the wavelengths should be made as close to each other as possible, or the peak power of the first light which is entered to IM-FM converter circuit should be increased.

Although certain preferred embodiments of the present invention have been shown and described in detail, it should be understood that various changes and modifications may be made therein without departing from the scope of the appended claims.

What is claimed is:

1. An optical timing extraction circuit comprising:
   converting means for converting an intensity modulated signal to an optical frequency modulated signal, said converting means modulating an optical frequency of a second light by a first light, said first light being modulated in intensity by an NRZ signal whose transmission rate is B bit/sec and said second light being a CW light;
   first narrow band-pass optical filter means receiving said second light, for selectively reflecting said second light which has been modulated in frequency by said converting means, a transmission center frequency of said first narrow band-pass optical filter means coinciding with a central frequency of said second light, a transmission bandwidth of said first narrow band-pass optical filter means being substantially equal to a modulated width of the frequency of said second light; and
   second narrow band-pass optical filter means having a free spectral range substantially equal to B Hz for extracting and emitting an optical clock signal of sinusoidal form whose frequency is B Hz, said optical clock signal being extracted from said second light modulated in intensity by said first narrow band-pass optical filter means.

2. An optical timing extraction circuit comprising:
   first narrow band-pass optical filter means, receiving a first light FSK-modulated by an NRZ signal whose transmission rate is B bit/sec, for converting said first light into an intensity modulated light signal, a transmission center frequency of said first filter means coinciding with a central frequency of said FSK-modulated first light;
   converting means for converting said intensity modulated light signal to an optical frequency modulated signal, said converting means receiving said first light, which has passed through said first narrow band-pass optical filter means to be converted into said intensity modulated light signal, and a second light, which is a CW light, said converting means modulating the optical frequency of said second light by said intensity modulated light signal;

second narrow band-pass optical filter means, receiving said second light, modulated in frequency by said converting means, for converting said second light into a light modulated in intensity at each time point corresponding to a frequency change in said FSK-modulated first light; and third narrow band-pass optical filter means for extracting and emitting an optical clock signal of sinusoidal form from said second light which was passed through said second narrow band-pass optical filter means.

3. An optical timing extraction circuit as set forth in claim 2 wherein a transmission center frequency of said second narrow band-pass optical filter means coincides with one peak optical frequency of said frequency-modulated second light, a central optical frequency of said second light lying substantially at one end of the transmission bandwidth, a portion of a frequency bandwidth of said second filter means ranging from the central optical frequency of said second light up to another peak optical frequency forming a reflecting frequency bandwidth, and the free spectral range of said third narrow band-pass optical filter means being approximately B Hz to emit an optical clock signal of sinusoidal form whose frequency is B Hz.

4. An optical timing extraction circuit as set forth in claim 2 wherein a transmission center frequency of said second narrow band-pass optical filter means substantially coincides with the frequency of said second light before its frequency is modulated by said converting means, and whose transmission band-width is below the modulation width of said second light; and the free spectral range of said third narrow band-pass optical filter means is approximately 2B Hz to emit an optical clock signal of sinusoidal form whose frequency is 2B Hz.

5. An optical timing extraction circuit as set forth in claim 1 wherein said optical frequency modulation of said second light by said first light is carried out by the optical Kerr effect in a polarization-maintaining fiber, each light being linearly polarized.

6. An optical timing extraction circuit as set forth in claim 2 wherein said optical frequency modulation of said second light by said first light is carried out by the optical Kerr effect in a polarization-maintaining fiber, each light being linearly polarized.

7. An optical timing extraction circuit as set forth in claim 3 wherein said optical frequency modulation of said second light by said first light is carried out by the optical Kerr effect in a polarization-maintaining fiber, each light being linearly polarized.

8. An optical timing extraction circuit as set forth in claim 4 wherein said optical frequency modulation of said second light by said first light is carried out by the optical Kerr effect in a polarization-maintaining fiber, each light being linearly polarized.

* * * * *